(12) United States Patent
Kinsel (10) Patent No.: US 6,651,941 B1
(45) Date of Patent: Nov. 25, 2003

(54) BAG CARRIER

(75) Inventor: David I. Kinsel, Sylvania, OH (US)

(73) Assignee: Integrity Innovations, Inc., Sylvania, OH (US)

( * ) Notice: Subject to any disclaimer, the term of this patent is extended or adjusted under 35 U.S.C. 154(b) by 0 days.

(21) Appl. No.: 09/933,288

(22) Filed: Aug. 20, 2001

Related U.S. Application Data (60) Provisional application No. 60/226,931, filed on Aug. 22, 2000.

(51) Int. Cl.[7] .............................. B65B 67/00; A45F 5/00
(52) U.S. Cl. ....................... 248/100; 294/142; 294/159; 294/170
(58) Field of Search ............................. 248/95, 99, 100; D9/434; D8/366; 224/218, 268, 270, 275; 298/137, 141, 143, 158, 159, 167, 170, 171; 294/142

(56) References Cited

U.S. PATENT DOCUMENTS

| | | | | |
|---|---|---|---|---|
| 35,096 A | * | 4/1862 | Carry ........................... 56/165 |
| 608,900 A | * | 8/1898 | Otto ............................ 248/95 |
| 1,137,909 A | | 5/1915 | Rusfeldt ...................... 294/33 |
| 1,286,940 A | * | 12/1918 | Cerny .......................... 24/373 |
| 1,340,714 A | * | 5/1920 | Herrman et al. .............. 248/99 |
| 1,461,802 A | * | 7/1923 | McRoberts ............ 211/119.01 |
| 1,659,130 A | | 2/1928 | Barnett ........................ 294/143 |
| 1,815,673 A | | 7/1931 | Kelley ........................ 211/119 |
| 1,895,904 A | * | 1/1933 | Lutts et al. .................. 141/390 |
| 2,007,039 A | | 7/1935 | Dickson ..................... 294/159 |
| 2,057,836 A | * | 10/1936 | Leonardson ................. 248/99 |
| 2,078,438 A | * | 4/1937 | Baxter ........................ 248/100 |

(List continued on next page.)

FOREIGN PATENT DOCUMENTS

| | | |
|---|---|---|
| DE | 3819580 | 12/1989 |
| FR | 2541099 | 8/1984 |
| GB | 2312614 | 11/1997 |
| GB | 2354698 | 4/2001 |
| JP | 401150602 A * | 6/1989 .................. 248/95 |

*Primary Examiner*—Ramon O. Ramirez
*Assistant Examiner*—Jon Szumny
(74) *Attorney, Agent, or Firm*—MacMillan, Sobanski & Todd, LLC (57) ABSTRACT

A bag carrier includes a generally planar body portion having a peripheral edge extending thereabout. The peripheral edge of the body portion may, if desired, include an enlarged upper flange portion, a pair of enlarged side flange portions, and an enlarged lower flange portion that extend continuously about the peripheral edge of the body portion. The body portion is preferably formed in an ergonomic manner, i.e., in a manner that is safe and comfortable for grasping by a human hand. A plurality of bag holding hooks extend laterally in opposite directions from the sides of the body portion. Each of the bag holding hooks is generally C-shaped, with the terminal ends thereof located adjacent to the side flange portions of the body portion. A plurality of suspension hooks also extend laterally in opposite directions from the sides of the body portion. Each of the suspension hooks includes an elongated flexible arm that terminates in a generally C-shaped suspension hook portion. The bag carrier is preferably formed from a single piece of plastic material, such as polyethylene terephthalate.

7 Claims, 5 Drawing Sheets

U.S. PATENT DOCUMENTS

| | | | | |
|---|---|---|---|---|
| D137,712 S | | 2/1944 | Miano | D9/434 |
| 2,522,833 A | * | 9/1950 | MacCaferri | 294/165 |
| 2,531,058 A | * | 11/1950 | Kralovic | 248/99 |
| 3,175,793 A | * | 3/1965 | Kennedy | 248/302 |
| 3,251,622 A | | 5/1966 | Miller | 294/33 |
| 3,302,837 A | | 2/1967 | Montgomery | 224/103 |
| 3,986,649 A | * | 10/1976 | Heimstra | 211/42 |
| D242,764 S | | 12/1976 | Kamins | D9/434 |
| 4,094,391 A | * | 6/1978 | Ratchford | 190/108 |
| 4,128,196 A | | 12/1978 | Hill | 224/264 |
| D255,332 S | | 6/1980 | DuCorday | D9/434 |
| 4,590,640 A | | 5/1986 | Enerson | 16/411 |
| 5,026,105 A | | 6/1991 | Feldman | 294/170 |
| 5,181,757 A | | 1/1993 | Montoya | 294/159 |
| D336,732 S | | 6/1993 | Joyner | D9/434 |
| 5,356,061 A | * | 10/1994 | Yu | 211/106 |
| 5,361,956 A | | 11/1994 | Recanati | 224/257 |
| D362,622 S | | 9/1995 | Van Davelaar | D9/434 |
| 5,447,259 A | | 9/1995 | Erickson | 220/759 |
| 5,487,581 A | | 1/1996 | Carmo et al. | 294/137 |
| 5,558,383 A | | 9/1996 | Lancellotti | 294/143 |
| 5,599,052 A | | 2/1997 | Van Davelaar | 294/159 |
| D380,670 S | * | 7/1997 | Blocker | D9/434 |
| 5,645,306 A | | 7/1997 | Kosteniuk | 294/137 |
| 5,651,575 A | | 7/1997 | Bystrom et al. | 294/171 |
| 5,667,266 A | | 9/1997 | Goicanti | 294/170 |
| 5,775,757 A | | 7/1998 | Tipp | 294/171 |
| D400,785 S | | 11/1998 | Randall | D9/434 |
| 5,836,634 A | | 11/1998 | Finkelman | 294/159 |
| 5,855,403 A | | 1/1999 | Harper | 294/158 |
| 5,865,494 A | | 2/1999 | Tipp | 294/171 |
| 5,894,972 A | | 4/1999 | Brown | 224/267 |
| D410,386 S | | 6/1999 | Watkins | D9/434 |
| 5,992,803 A | | 11/1999 | LeRoux | 248/100 |
| 6,041,945 A | | 3/2000 | Faraj | 211/12 |
| 6,045,019 A | | 4/2000 | Moses | 224/257 |
| 6,056,344 A | | 5/2000 | Forsyth | 294/171 |
| 6,062,622 A | | 5/2000 | Susman et al. | 298/149 |
| D440,492 S | * | 4/2001 | Ellers | D9/434 |
| D441,651 S | | 5/2001 | Nygren | D9/434 |
| 6,347,822 B1 | * | 2/2002 | Miller, Jr. | 294/137 |

* cited by examiner

BAG CARRIER

CROSS REFERENCE TO RELATED APPLICATION

This application claims the benefit of U.S. Provisional Application Serial No. 60/226,931, filed Aug. 22, 2000.

BACKGROUND OF THE INVENTION

The invention relates in general to devices for facilitating the carrying of various items, such as bags having handles. In particular, this invention relates to an improved device for carrying and suspending flexible plastic bags having handles.

It is common for shoppers to carry and transport items such as groceries, clothing, sundries, and the like in flexible plastic bags having handle portions. While carrying such bags, shoppers may experience unpleasant discomfort or pain in their hands and fingers. This unpleasant feeling is caused by the weight of the contents in the flexible plastic bags, which causes the relatively thin handle portions to exert an uncomfortable amount of force on the hands and fingers of the user. Additionally, when shoppers transport items in such plastic bags, the bags may not adequately contain the items. For example, groceries that are contained within these flexible plastic bags are prone to tipping over, such as when sitting on the floor or seat of an automobile during acceleration, deceleration, and cornering. This is because the flexible plastic bags lack sufficient rigidity to maintain the items contained therein in a stable position during transport.

Although a variety of devices are known in the art for carrying such handled plastic bags, it would be desirable to provide an improved bag carrier for carrying and suspending multiple plastic bags that is comfortable to hand-carry, convenient to store in a purse or pocket, and inexpensive to manufacture. It would be further desirable to provide an improved bag carrier for carrying and suspending multiple plastic bags that can be suspended from or attached to an object, thereby preventing the contents from falling or spilling during transport.

SUMMARY OF THE INVENTION

The invention relates to an improved bag carrier for carrying and suspending multiple plastic bags that can be suspended from or attached to an object, thereby preventing the contents from falling or spilling during transport. The bag carrier includes a generally planar body portion having a peripheral edge extending thereabout. The peripheral edge of the body portion may, if desired, include an enlarged upper flange portion, a pair of enlarged side flange portions, and an enlarged lower flange portion that extend continuously about the peripheral edge of the body portion. The body portion is preferably formed in an ergonomic manner, i.e., in a manner that is safe and comfortable for grasping by a human hand. A plurality of bag holding hooks extend laterally in opposite directions from the sides of the body portion. Each of the bag holding hooks is generally C-shaped, with the terminal ends thereof located adjacent to the side flange portions of the body portion. A plurality of suspension hooks also extend laterally in opposite directions from the sides of the body portion. Each of the suspension hooks includes an elongated flexible arm that terminates in a generally C-shaped suspension hook portion. The bag carrier is preferably formed from a single piece of plastic material, such as polyethylene terephthalate.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
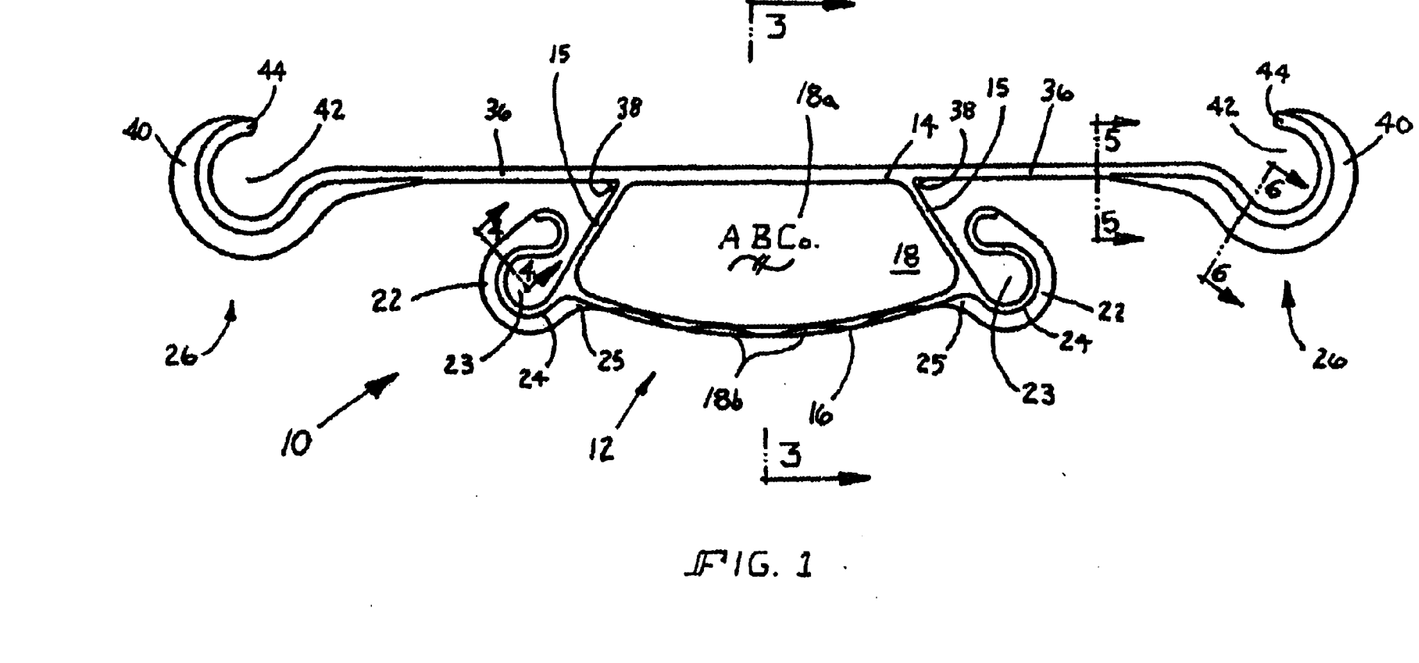
FIG. 1 is a front elevational view of a first embodiment of a bag carrier in accordance this invention.
Figure 2:
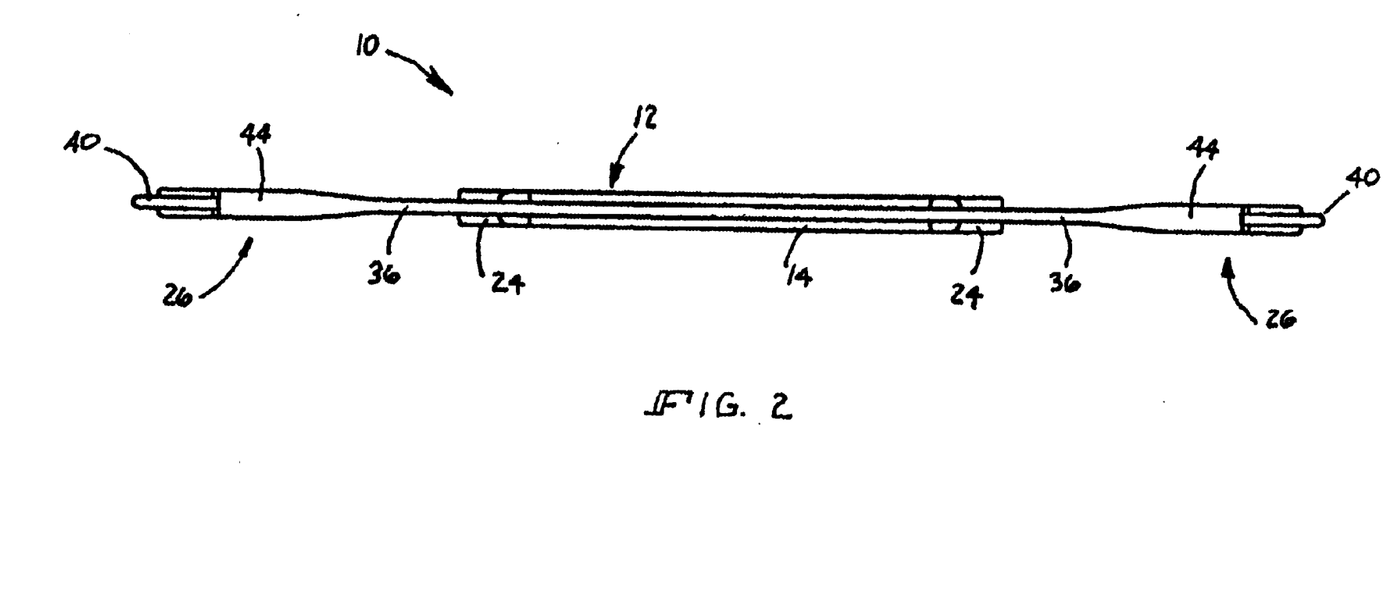
FIG. 2 is a top plan view of the bag carrier illustrated in FIG. 1.
Figure 3:
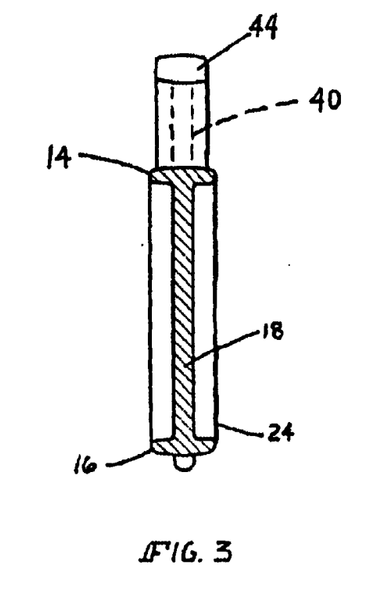
FIG. 3 is a sectional elevational view of the bag carrier taken along line 3—3 of FIG. 1.

Referring now to the drawings, there is illustrated in FIGS. 1 and 2 a first embodiment of a bag carrier, indicated generally at 10, in accordance with this invention. The bag carrier 10 includes a generally planar body portion, indicated generally at 12, having a peripheral edge extending thereabout. The peripheral edge of the body portion 12 may, if desired, include an enlarged upper flange portion 14 (see FIG. 3), a pair of enlarged side flange portions 15, and an enlarged lower flange portion 16. In the illustrated embodiment, the flange portions 14, 15, and 16 extend continuously about the peripheral edge of the body portion 12, although such is not required. The upper flange portion 14 extends along a generally linear path, while the side flange portions 15 and the lower flange portions 16 extend along generally arcuate paths. However, the flange portions 14, 15, and 16 may be formed having any desired shape. The illustrated body portion 12 includes a flat, central web 18 having opposed generally planar surfaces. In the illustrated embodiment, the central web 18 of the body portion 12 has a thickness that is less than the thickness of the flange portions 14, 15, and 16, although such is not required.

The body portion 12 is preferably formed in an ergonomic manner, i.e., in a manner that is safe and comfortable for grasping by a human hand. If desired, lettering or other indicia 18a may be formed in or otherwise provided on the central web 18 of the body portion 12. The lower surface of the lower flange portion 16 may include a non-smooth texture, such as the illustrated plurality of arcuately shaped surface depressions 18b, to visually indicate to the user that the body portion 12 may be used as a handgrip. Alternatively, the lower surface of the lower flange 16 may have a plurality of scalloped recesses (not shown) formed therein that are adapted to receive the fingers of the hand of the user therein.

Figure 4:
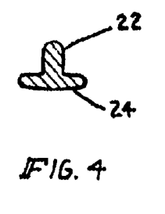
FIG. 4 is a sectional elevational view of the bag carrier taken along line 4—4 of FIG. 1.

A plurality (two in the illustrated embodiment) of bag holding hooks 22 extend from the body portion 12 of the bag carrier 10. As best shown in FIG. 1, the bag holding hooks 22 extend laterally in opposite directions from the sides of the body portion 12. However, the bag holding hooks 22 may extend in any desired direction from any portion of the body portion 12. Preferably, the bag holding hooks 22 are co-planar with the body portion 12, as best shown in FIG. 2, and are located immediately adjacent to the body portion 12. Each of the bag holding hooks 22 is generally C-shaped, with the terminal ends thereof located adjacent to the side flange portions 15 of the body portion 12. The openings of such bag holding hooks 22 thus face generally upwardly and define respective partially enclosed spaces 23, the purpose of which will be described in detail below. If desired, each of the bag holding hooks 22 may be formed having an enlarged stiffening rib 24, as best shown in FIG. 4. Also, a transition fillet 25 may be formed between the body portion 12 and each of the bag holding hooks 22 to increase the strength thereof.

Figure 5:
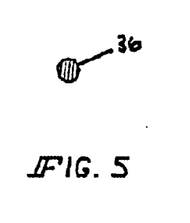
FIG. 5 is a sectional elevational view of the bag carrier taken along line 5—5 of FIG. 1.
Figure 6:
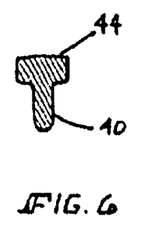
FIG. 6 is a sectional elevational view of the bag carrier taken along line 6—6 of FIG. 1.

A plurality (two in the illustrated embodiment) of suspension hooks, indicated generally at 26, also extend from the body portion 12 of the bag carrier 10. As best shown in FIG. 1, the suspension hooks 26 extend laterally in opposite directions from the sides of the body portion 12. However, the suspension hooks 26 may extend in any desired direction from any portion of the body portion 12. Preferably, the suspension hooks 26 are co-planar with the body portion 12, as best shown in FIG. 2. Each of the illustrated suspension hooks 26 includes an elongated flexible arm 36 that extends from the body portion 12 and has a generally circular cross sectional shape (see FIG. 5), although such is not required. If desired, a transition fillet 38 may be formed between the body portion 12 and each of the elongated flexible arms 36 to increase the strength thereof. Each of the elongated flexible arms 36 terminates in a generally C-shaped suspension hook portion 40. The openings of such suspension hook portions 40 face generally upwardly and define respective partially enclosed spaces 42, the purpose of which will be described in detail below. If desired, each of the suspension hook portions 40 may be formed having an enlarged stiffening rib 44, as best shown in FIG. 6.

The bag carrier 10 is preferably formed from a plastic material, such as polyethylene terephthalate (PETE), for example. However, the bag carrier 10 may be formed from any desired material. Also, the bag carrier 10 is preferably formed from a single piece of material, such as by using a conventional injection molding process. However, it will be appreciated that the bag carrier 10 can be molded or otherwise manufactured in more than one piece that are subsequently secured or otherwise assembled together by any suitable method, such as by adhesive or threaded fasteners.

Figures 7, 8:
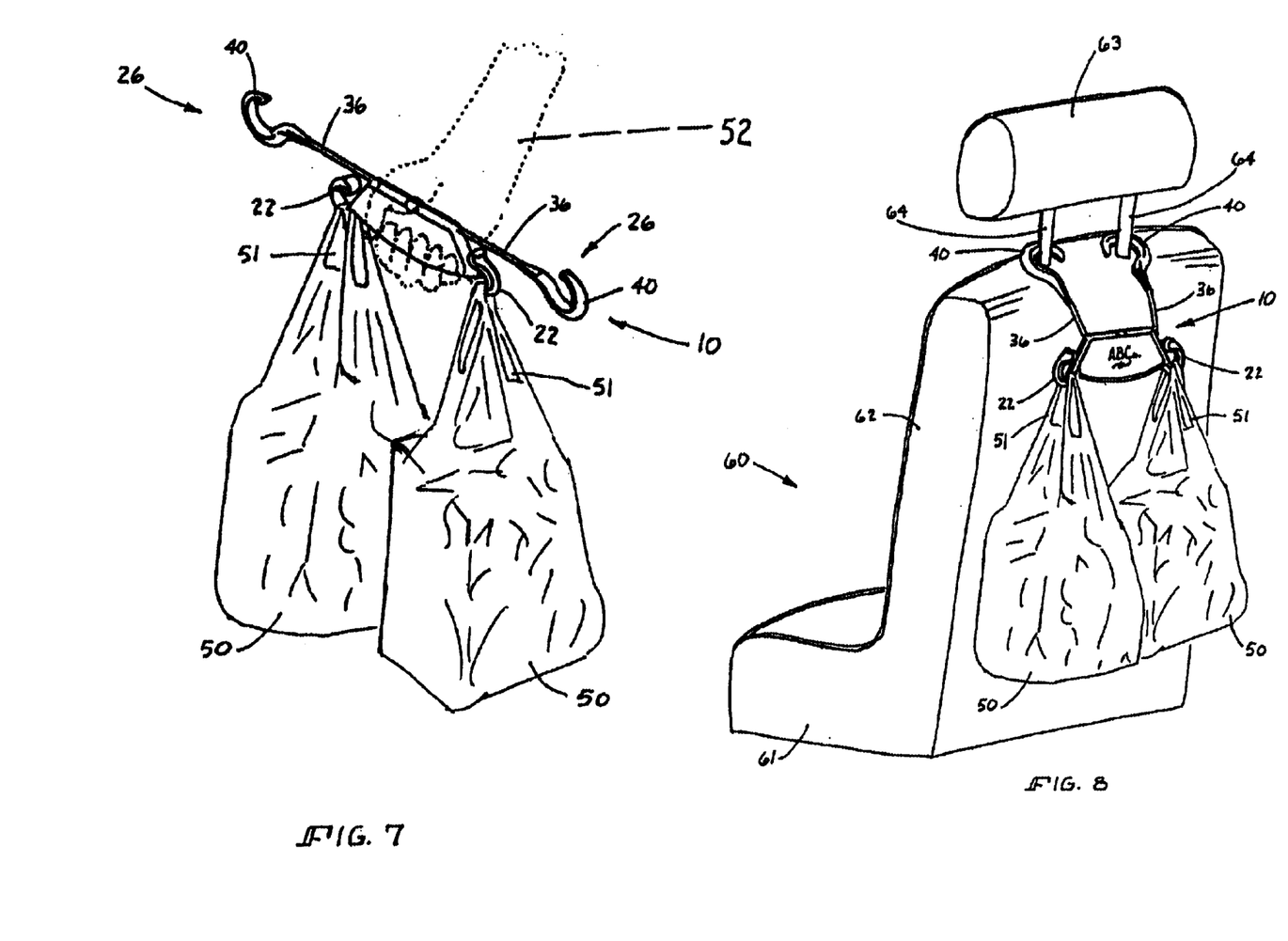
FIG. 7 is a perspective view showing the bag carrier illustrated in FIGS. 1 through 6 being used to suspend a plurality of bags from a hand of a user.
FIG. 8 is a perspective view showing the bag carrier illustrated in FIGS. 1 through 7 being used to suspend a plurality of bags from a portion of an automobile seat.

FIG. 7 illustrates a first manner of using the bag carrier illustrated in FIGS. 1 through 6 to suspend a plurality of bags from a hand of a user. As shown therein, a pair of bags 50 having respective loops 51 are suspended from the bag carrier 10. To accomplish this, the loops 51 of the bags 50 are initially disposed about the bag holding hooks 22 of the bag carrier 10. Any desired number of such bags 50 may be suspended from the bag carrier 10, limited only by the strength of the user and the bag carrier 10 itself. It is anticipated, however, that a typical bag carrier 10 will comfortably support up to four of such bags 50 that are filled with items. As mentioned above, each of the bag holding hooks 22 has a terminal end located adjacent to the side flange portions 15 of the body portion 12 such that the openings of such bag holding hooks 22 face generally upwardly and define respective partially enclosed spaces 23. The loop portions 51 of the bags 50 are received within the partially enclosed spaces 23 defined by the bag holding hooks 22 and are securely retained therein because of the proximity of the terminal ends of the bag holding hooks 22 to the side flange portions 15 of the body portion 12. Then, the body portion 12 of the bag carrier 10 can be easily grasped and lifted, such as by a hand 52 of a user. The suspension hooks 26, including the flexible arm portions 36 and the suspension hook portions 40, are not employed when the bag carrier 10 is manually supported by the hand 52 of the user.

FIG. 8 is a perspective view showing the bag carrier illustrated in FIGS. 1 through 7 being used to suspend a plurality of bags 50 from a support surface, such as a portion of an automobile seat, indicated generally at 60. The illustrated vehicle seat 60 includes a seat portion 61 and a back portion 62. A head rest 63 is adjustably supported on the back portion 62 of the vehicle seat 60 by a pair of pillars 64. Although this invention will be described in the context of the illustrated vehicle seat 60, it will be appreciated that the bag carrier 10 of this invention may be used on any type of structure that is capable of being engaged by the bag carrier 10 in the manner described below for suspending one or more bags therefrom. For example, the bag carrier 10 of this invention may be used to support the bags 50 on a shopping cart (not shown) for transport from a grocery store to the vehicle.

After the bags 50 have been supported on the bag carrier 10 in the manner described above, the user may then attach the suspension hooks 26 to a support surface, such as the pillars 64 of the vehicle seat 60. The flexible arms 36 of the suspension hooks 26 facilitate the connection of the suspension hook portions 40 to the support pillars 64. The suspension hook portions 40 of the suspension hooks 26 can be sized to be somewhat larger than the bag holding hooks 22 to further facilitate the connection of the suspension hook portions 40 to the support surface. Once the suspension hook portions 40 are connected to the pillars 64, the body portion 12 of the bag carrier 10 is released, allowing the weight of the bags 50 to pull downwardly on the bag carrier 10. As a result, the suspension hook portions 40 of the suspension hooks 26 are securely retained on the pillars 64 of the vehicle seat 60. Consequently, the bags 50 are retained in an upright position for transport, preventing the contents of such bags 50 from falling or spilling out.

Figure 9:
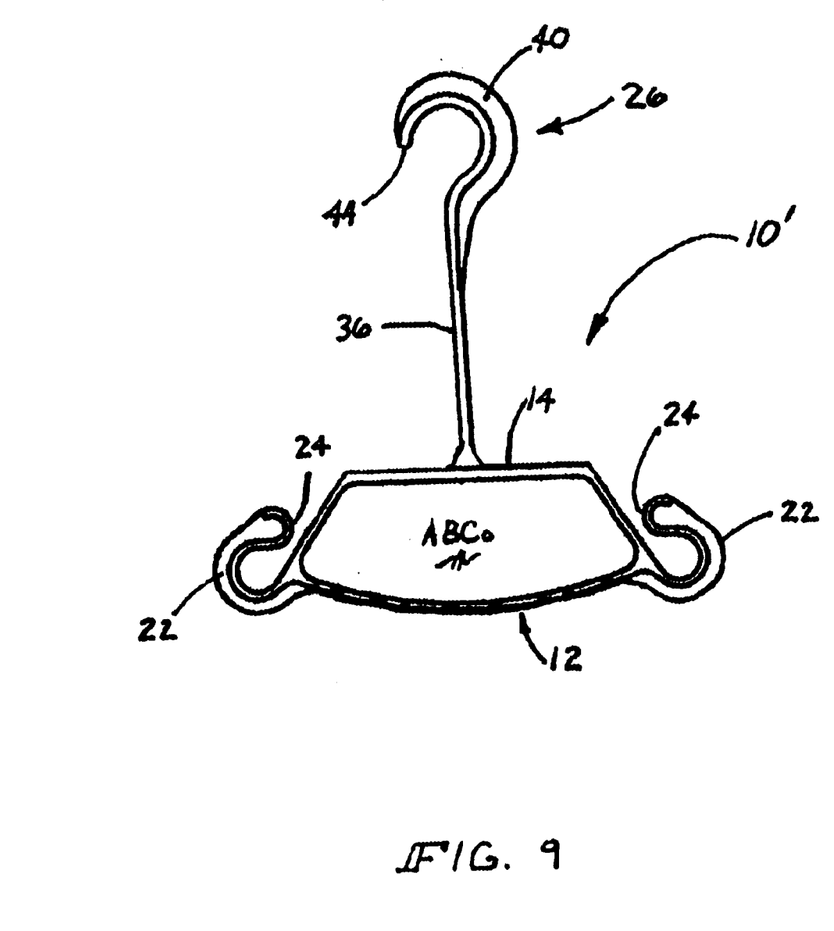
FIG. 9 is a side elevational view of a second embodiment of a bag carrier in accordance with this invention.

Referring now to FIG. 9, there is illustrated a second embodiment of a bag carrier, indicated generally at 10'. The modified bag carrier 10' is similar in structure to the above-described bag carrier 10, and like reference numbers are used to indicate similar structures. The modified bag carrier 10' includes only a single suspension hook 26 that extends upwardly from the body portion 12 of the modified bag carrier 10', such as from the central portion of the upper flange 14. The single suspension hook 26 can be connected to a support surface, such as the above-described pillars 64 of the vehicle seat 60, in the manner described above. If desired, the elongated flexible arm 36 can be omitted such that the suspension hook 40 is formed directly with the body portion 12 of the modified bag carrier 10'.

In accordance with the provisions of the patent statutes, the principle and mode of operation of this invention have been described in its preferred embodiments. However, it should be noted that this invention may be practiced otherwise than as specifically illustrated and described without departing from its spirit or scope.

What is claimed is:

1. A bag carrier comprising:

a body portion that is adapted to be grasped by a user for carrying a bag;

at least two a bag supporting hooks extending from opposite ends of said body portion and respectively located at first distances from said body portion, each of said bag supporting hooks adapted to engage and support at least one bag thereon; and at least two suspension hooks including respective elongated arms that extend from opposite ends of said body portion and terminate in a suspension hook portions respectively located at second distances from said body portion that are greater than said first distances, said suspension hook portions adapted to support the body portion on a support surface such that a bag that is engaged and supported on said bag supporting hooks can be either carried by a user grasping said body portion or supported on a support surface by said suspension hook portions.

2. The bag carrier defined in claim 1 wherein each of said arms of said suspension hooks is flexible.

3. The bag carrier defined in claim 1 wherein each of said suspension hook portions is generally C-shaped.

4. The bag carrier defined in claim 1 wherein each of said suspension hook portions has a stiffening rib formed therein.

5. The bag carrier defined in claim 1 wherein each of said bag supporting hooks is generally C-shaped, having a terminal end that is located adjacent to said body portion.

6. The bag carrier defined in claim 1 wherein each of said bag supporting hooks has a stiffening rib formed therein.

7. A method of transporting a bag comprising the steps of:

(a) providing a bag carrier including a body portion that is adapted to be grasped by a user for carrying the bag, at least two bag supporting hooks extending from opposite ends of the body portion and respectively located at first distances from the body portion, and at least two suspension hooks including respective elongate arms that extend from opposite ends of the body portion and terminate in suspension hook portions respectively located at second distances from the body portion that are greater than the first distances;

(b) suspending a bag from at least one of the bag supporting hooks; and (c) transporting the bag by grasping the body portion to carry the bag and connecting at least one of the suspension hooks to a support surface so as to suspend the body portion of the bag carrier and the bag from the support surface.

* * * * *

UNITED STATES PATENT AND TRADEMARK OFFICE
CERTIFICATE OF CORRECTION

PATENT NO. : 6,651,941 B1
DATED : November 25, 2003
INVENTOR(S) : David I. Kinsel

It is certified that error appears in the above-identified patent and that said Letters Patent is hereby corrected as shown below:

<u>Column 5,</u>
Line 5, delete the word "a".
Line 12, delete the word "a".

<u>Column 6,</u>
Line 13, replace the word "gate" with -- gated --.

Signed and Sealed this

Twenty-seventh Day of April, 2004

JON W. DUDAS
*Acting Director of the United States Patent and Trademark Office*